(12) United States Patent
Krug et al.

(10) Patent No.: US 6,513,840 B1
(45) Date of Patent: Feb. 4, 2003

(54) DRILL ROD COUPLING

(75) Inventors: Gerhard Krug, Duisburg (DE); Erich Quadflieg, Krefeld (DE)

(73) Assignee: Mannesmann AG, Düsseldorf (DE)

( * ) Notice: Subject to any disclaimer, the term of this patent is extended or adjusted under 35 U.S.C. 154(b) by 0 days.

(21) Appl. No.: 09/719,980

(22) PCT Filed: May 21, 1999

(86) PCT No.: PCT/DE99/01566
§ 371 (c)(1),
(2), (4) Date: Dec. 18, 2000

(87) PCT Pub. No.: WO99/66170
PCT Pub. Date: Dec. 23, 1999

(30) Foreign Application Priority Data

Jun. 17, 1998 (DE) .......................... 198 27 821

(51) Int. Cl.$^7$ ............................... F16L 25/00
(52) U.S. Cl. ........................ 285/334; 285/333
(58) Field of Search ................ 285/333, 334, 285/390, 355, 383

(56) References Cited

U.S. PATENT DOCUMENTS

| | | | | |
|---|---|---|---|---|
| 2,461,107 A | * | 2/1949 | Church | 285/355 X |
| 3,508,771 A | * | 4/1970 | Duret | 285/334 |
| 4,548,431 A | * | 10/1985 | Hall et al. | 285/334 |
| 4,984,829 A | * | 1/1991 | Saigo et al. | 285/334 |
| 5,492,375 A | * | 2/1996 | Smith | 285/334 |
| 5,505,502 A | * | 4/1996 | Smith et al. | 285/334 |
| 5,908,212 A | * | 6/1999 | Smith et al. | 285/333 |
| 6,047,997 A | * | 4/2000 | Olivier | 285/333 |
| 6,244,631 B1 | * | 6/2001 | Payne et al. | 285/333 |

* cited by examiner

Primary Examiner—Lynne H. Browne
Assistant Examiner—David E. Bochna
(74) Attorney, Agent, or Firm—Cohen, Pontani, Lieberman & Pavane

(57) ABSTRACT

A boring rod connector with a journal element that has a tapered external thread section located between an outer shoulder and a journal face, a thread-free section located between the outer shoulder and the external thread section, and a thread-free section located between the external thread section and the journal face, and with a sleeve element that can be screwed to the journal element and has a tapered internal thread section located between an inner shoulder and a sleeve face, a thread-free section located between the inner shoulder and the internal thread section, and a thread-free section located between the internal thread section and the sleeve face. The thread-free sections of the journal element and the sleeve element located in the area of the inner shoulder that, when a screw connected exists, lie opposite to each other, have a different length than the thread-free sections of the journal element and the sleeve element located in the region of the inner shoulder. The inner shoulder forms the primary shoulder and, after the drill pipe connector is assembled and screwed to up to 90% of its yield point, the journal face tightens on the inner shoulder up to a pressure that exceeds the pressure exerted by the sleeve face on the outer shoulder, whereby the sleeve face tightens mainly on the outer shoulder when an additional torque occurs during boring. The thread-free sections located in the region of the inner shoulder are at least twice as long as the thread-free sections located in the region of the outer shoulder.

8 Claims, 2 Drawing Sheets

DRILL ROD COUPLING

PRIORITY CLAIM

This is a U.S. national stage of application No. PCT/DE99/01566, filed on May 21, 1999, 198 27 821.7 filed Jun. 17, 1998. Priority is claimed on that application, Country: Germany.

BACKGROUND OF THE INVENTION

1. Field of the Invention

The invention relates to a drill pipe connector.

2. Discussion of the Prior Art

A generic boring rod connector is known from WO96/03605. This connector comprises a journal element that has a tapered external thread section located between an outer shoulder and a journal face, a thread-free section located between the outer shoulder and the external thread section, and a thread-free section located between the external thread section and the journal face. The connector further comprises a sleeve element that can be screwed to the journal element. The sleeve element has a tapered internal thread section located between an inner shoulder and a sleeve face, a thread-free section located between the inner shoulder and the internal thread section, and a thread-free section located between the internal thread section and the sleeve face. The thread-free sections of the journal element and the sleeve element in the region of the outer shoulder, which, when a screw connection exists, are located opposite to each other, are longer than the thread-free sections located in the region of the inner shoulder. The outer shoulder, which, when a screw connection exists, comes into contact with the sleeve face, forms the primary shoulder. The axial forces that occur in the primary shoulder when a screw connection exists are greater than the forces that occur in the inner shoulder. The screw connection is thereby established with at least 50%, preferably 60%, of the yield point of the drill pipe connector.

The outer diameter of the sleeve element is smaller in the region of the thread-free section than in the remaining sleeve element. This cross-sectional reduction allows the thread-free section of the sleeve element to butt together with the axial elongation of the thread-free section of the journal element when the primary shoulder is activated.

The known drill pipe connector has the disadvantage that the stresses that occur during the establishment and use of the screw connection are taken into account exclusively as axial stresses, so that the part cannot be fully used. The screwing moment is too small, so that the danger exists that the abutting surfaces will separate. Such separation reduces the alternate loadability and can lead to a permanent break.

A comparable drill pipe connector is disclosed in DE 32 45 819 B1. This connector has the same features as the drill pipe connector described above. In this connector, too, the outer shoulder forms the primary shoulder and is activated first when a screw connection is established. Moreover, the thread-free sections located in the region of the outer shoulder are longer than the thread-free sections located in the region of the inner shoulder. It is also proposed that the distance from the sleeve face to the inner shoulder be greater than the distance from the journal face to the outer shoulder. As a result, a gap is created when the sleeve face comes to rest on the outer shoulder during the manual establishment of the screw connection.

SUMMARY OF THE INVENTION

The aforementioned disadvantage is found in this connector as well, i.e., the overall stress conditions are taken into account only partly, and the part thus cannot be fully used.

This object is attained, starting from the introductory part, in connection with the characterizing features of Patent Claim 1. Advantageous further developments are the subject matter of subclaims.

The core of the invention is that, in contrast to the known embodiments, in the design according to the invention it is the inner shoulder that forms the primary shoulder, and the thread-free sections located in the region of the inner shoulder are at least twice, and preferably three times, as long as the thread-free sections located in the region of the outer shoulder.

This arrangement has the advantage that, due to the long thread-free section of the journal, the tolerances of the drill pipe connection can be better compensated for. Furthermore, when the primary shoulder is located on the inner shoulder, higher forces can be absorbed, because of lower relative stresses. This is true even when the outer abutting surface is larger than the inner abutting surface. As a result, the outer shoulder and the inner shoulder can be optimally used. The prestressing of the inner shoulder results in a defined residual share of forces for the outer shoulder. This residual share can be optimized, taking into account the manufacturing tolerances, and can be distributed, overall, to achieve a higher degree of utilization of the inner shoulder and outer shoulder than has previously been known. All told, this results in higher permissible screwing torque or working torque.

The distance from the journal face to the outer shoulder is greater than the distance from the sleeve face to the inner shoulder. This is true regardless of the tolerances. The long thin lip of the journal is thereby used as a soft spring path for the prestress of the drill pipe connector. Depending on the length tolerances, the inner and outer shoulders are differently stressed, but without exceeding a load of 90% of the yield point. By the interaction of the inner shoulder and the outer shoulder, a torsion moment of approximately 80% of the yield point is attained.

To reduce the total stress, it is further proposed that, while maintaining a rough standard thread for the external and internal threaded sections of the journal element and sleeve element, a steeper angle of between 15° and 20°, instead of 30° as per API, be established for the load flank. At an angle of 18°, for example, the portion of axial force extending in the radial direction is virtually halved. The 45° shear surface is also enlarged. Thus, the overall stresses become more favorable, and the part can be more heavily loaded. A further improvement results when some of the moments are absorbed by a deliberate overlap in the thread region near the inner shoulder. This can be attained, preferably, by having different taper inclinations for the respective threaded sections. The taper inclination of the sleeve element is thereby steeper than that of the journal element. The difference in taper inclination is in the range of 0.03 to 0.3 mm/inch. The inner shoulders are relieved by the thread overlap, so that the screwing moment can be further increased.

Another improvement of the design relates to wear on the outer diameter of the sleeve. It is proposed to provide the outer surface of the sleeve, from the face to approximately over the third thread stage, with an internal turning. This ensures that even when wear occurs on the outer diameter of the sleeve, the critical cross-sections, and thus the stress conditions, remain constant. As soon as the region of the internal turning of the sleeve itself shows the first signs of wear, the drill pipe connector must be replaced or, if possible, reworked.

BRIEF DESCRIPTION OF THE DRAWINGS

The proposed design makes it possible to transmit a relatively high torque with smaller dimensional relations, i.e., with a smaller ratio of the outer diameter to the inner diameter. A small ratio of the outer diameter to the inner diameter (i.e., a larger inside diameter and/or a correspondingly enlarged external annular space) are favorable, first of all, for minimizing pressure losses in the interior of the drill pipe and, secondly, for the unobstructed transport in the external annular space of the bore flush with boring debris.

An example of a drill pipe connector embodied according to the invention is described in greater detail in reference to the drawings. The drawings show.

DETAILED DESCRIPTION OF THE PREFERRED EMBODIMENTS

Figure 1:
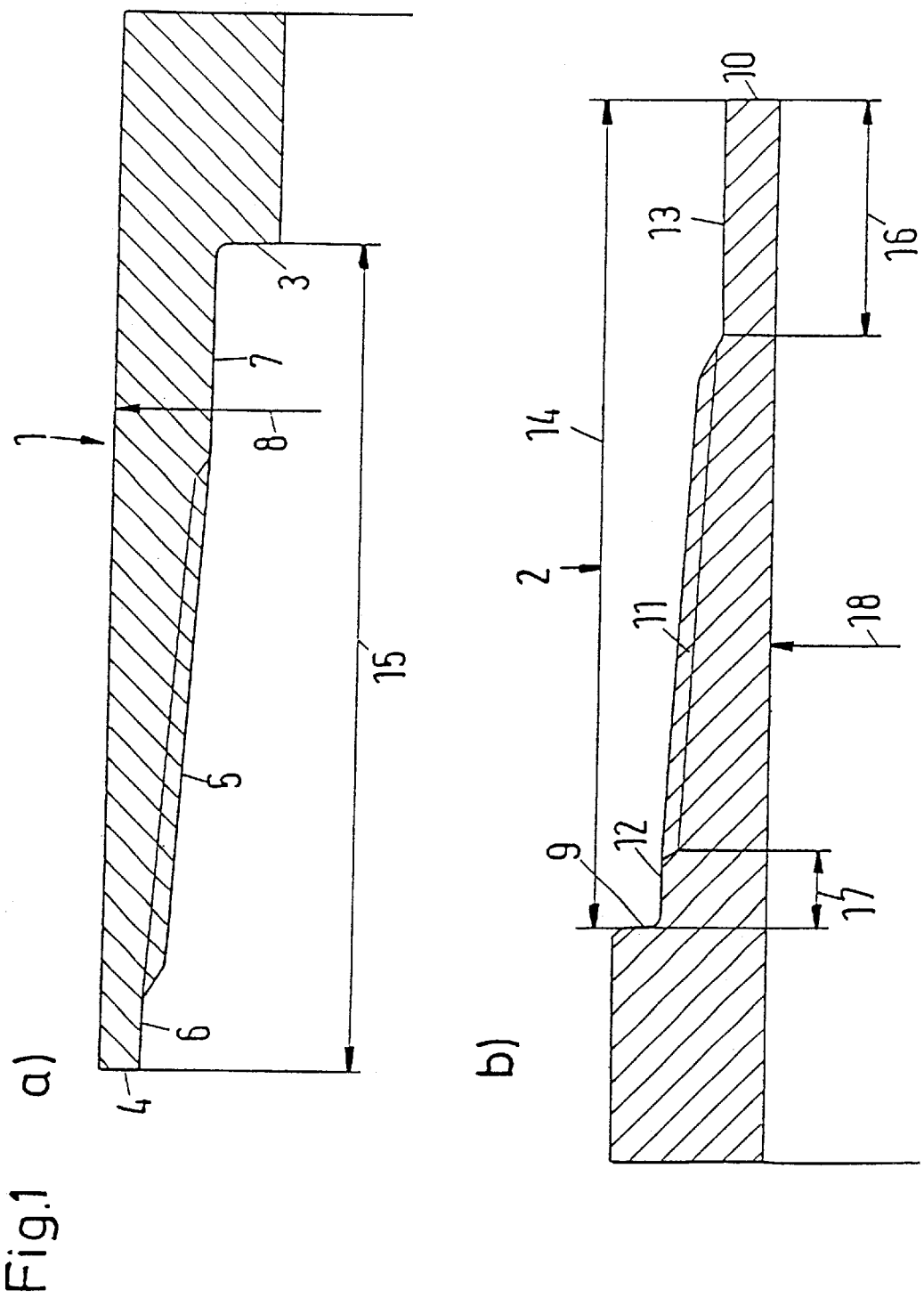
FIG. 1a In half-page longitudinal section: a sleeve element embodied according to the invention.
FIG. 1b In half-page longitudinal section: a journal element embodied according to the invention.

FIG. 1a shows, in a half-page longitudinal section, a sleeve element 1 embodied according to the invention. FIG. 1b shows a journal element 2 embodied according to the invention. The sleeve element 1 has a tapered internal threaded section 5 located between an inner shoulder 3 and a sleeve face 4. A tapered thread-free section 6 is located between the beginning of the internal thread section 5 and the sleeve face 4. A second cylindrical thread-free section 7 is located between the end of the internal thread section 5 and the inner shoulder 3. The outer diameter of the sleeve element 1 is indicated by an arrow 8. The journal element 2 embodied according to the invention, which can be screwed to the sleeve element 1, has an external thread section 11 located between an outer shoulder 9 and a journal face 10. A cylindrical thread-free section 12 is located between the end of the external thread section 11 and the outer shoulder 9. The cylindrical thread-free section 13 is located between the beginning of the external thread section 11 and the journal face 10.

According to the invention, the inner shoulder 3 forms the primary shoulder, which is activated first when a screw connection is established manually. This is because the distance 14 between the journal face 10 and the outer shoulder 9 is greater than the distance 15 between the inner shoulder 3 and the sleeve face 4. A further essential characteristic of the drill pipe connector according to the invention is that the length 16 of the two opposite thread-free sections 7, 13 of the sleeve element 1 and the journal element 2 is at least twice as great as the length 17 of the two opposite thread-free sections 6, 12 of the sleeve element 1 and the journal element 2. The inner diameter of the journal element 2 is indicated by an arrow 18.

Figure 2:
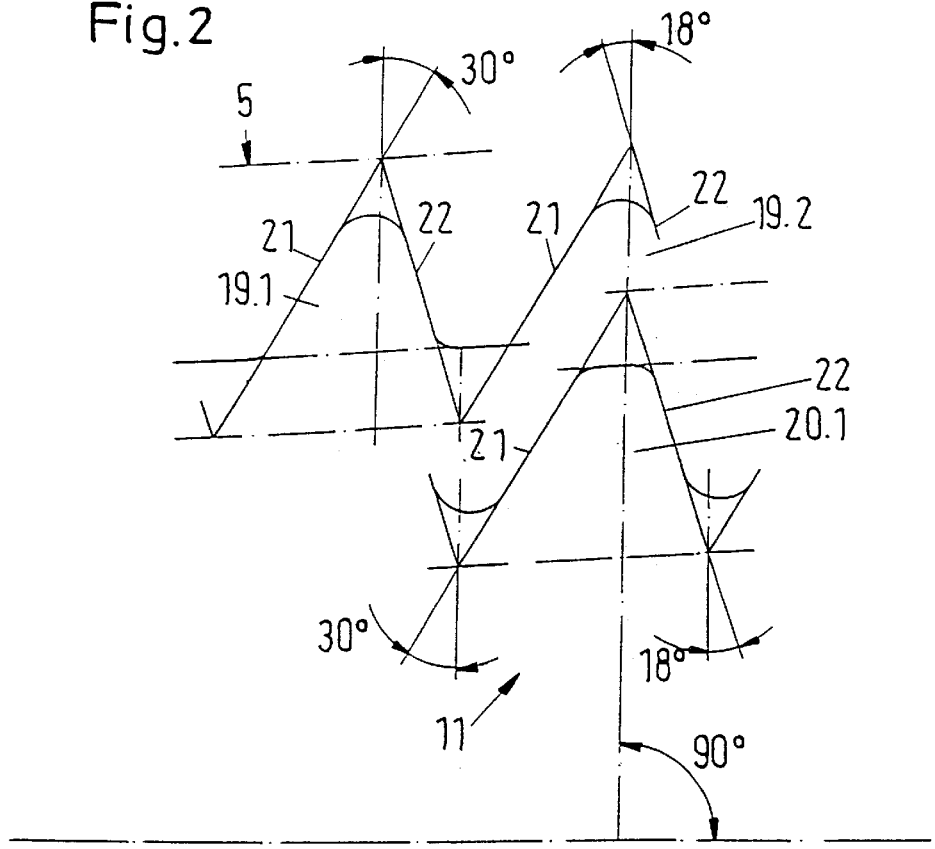
FIG. 2 In enlarged scale: the thread form according to the invention.

FIG. 2 shows an enlarged view of the thread form according to the invention. The upper part of FIG. 2 shows, sectionally, 1½ tooth 19.1, 19.2 of the internal thread section 5 of the sleeve 1. The lower part of FIG. 2 shows, sectionally, a tooth 20.1 of the external thread section 11 of the journal 2. The basic form of the two thread sections 5, 11 is a rough standard thread as per API, which is advantageous in light of the frequent required establishment of screw connections, which can number as many as 100, and also for the threading, i.e., the "stabbing", of the journal 2 and the sleeve 1. The guidance flank 21 has, as per the API regulation, an angle of 30°. Deviating from this, the angle of the load flank 22 is steeper, i.e, in the range from 15° to 20°, preferably 18°. This is also true for the teeth 20.1 of the external thread section 11 of the journal 2.

Figure 3:
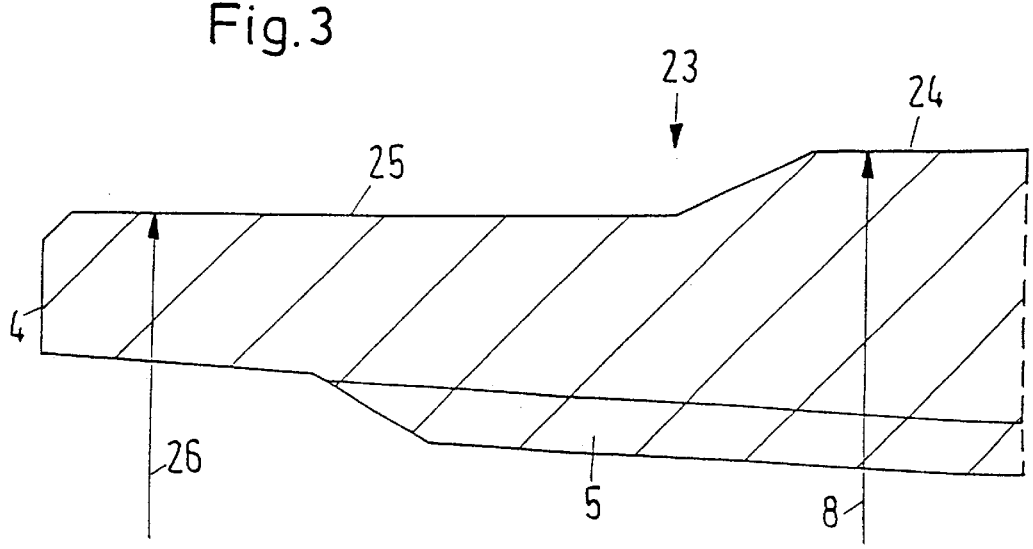
FIG. 3 In half-page longitudinal section: a variant of the sleeve element.

FIG. 3 shows, in a half-page longitudinal section, a variant of a sleeve element 23. In contrast to the sleeve element 1. in FIG. 1a, the outer surface 24 of the sleeve element 23 has an internal turning 25 that reduces the outer diameter 8. This internal turning is basically a indicator for the degree of wear on the outer surface 24 of the sleeve element 23. As wear increases, the outer diameter 8 of the outer surface 24 comes ever closer to the diameter 26 of the internal turning 25. The diameter 26 of the internal turning 25 is selected in such a way that optimal stress conditions exist for this cross-section as well.

Thus, while there have been shown and described and pointed out fundamental novel features of the present invention as applied to a preferred embodiment thereof, it will be understood that various omissions and substitutions and changes in the form and details of the devices illustrated, and in their operation, may be made by those skilled in the art without departing from the spirit of the present invention. For example, it is expressly intended that all combinations of those elements and/or method steps which perform substantially the same function in substantially the same way to achieve the same results are within the scope of the invention. Substitutions of elements from one described embodiment to another are also fully intended and contemplated. It is also to be understood that the drawings are not necessarily drawn to scale but that they are merely conceptual in nature. It is the intention, therefore, to be limited only as indicated by the scope of the claims appended hereto.

What is claimed is:

1. A drill pipe connector, comprising: a journal element that has an outer shoulder, a journal face, a tapered external thread section located between the outer shoulder and the journal face, a thread-free section located between the outer shoulder and the external thread section, and a thread-free section located between the external thread section and the journal face; and a sleeve element that can be screwed to the journal element and has an inner shoulder, a sleeve face, a tapered internal thread section located between the inner shoulder and the sleeve face, a thread-free section located between the inner shoulder and the internal thread section, and a thread-free section located between the internal thread section and the sleeve face, whereby the thread-free sections of the journal element and the sleeve element located in a region of the inner shoulder that, when a screw connection exists, lie opposite to each other, have a different length than the thread-free sections of the journal element and the sleeve element located in a region of the outer shoulder, the inner should forming a primary shoulder and the journal face tightens on the inner shoulder up to a pressure that exceeds a pressure exerted by the sleeve face on the outer shoulder when the drill pipe connector is assembled and screwed to up to 90% of its yield point so that the sleeve face tightens mainly on the outer shoulder when an additional torque occurs during boring, the thread-free sections located in the region of the inner shoulder being at least twice as long as the thread-free sections located in the region of the outer shoulder.

2. A drill pipe connector as defined in claim 1, wherein the thread-free sections located in the region of the inner shoulder are three times as long as the thread-free sections located in the region of the outer shoulder.

3. A drill pipe connector as defined in claim 1, wherein a distance between the journal face and the outer shoulder is greater than a distance between the sleeve face and the inner shoulder.

4. A drill pipe connector as defined in claim 1, wherein the internal thread section and the external thread section are equipped with a rough standard thread with a load flank having an angle in a range 15° to 20°, and a guidance flank having an angle of 30°.

5. A drill pipe connector as defined in claim 4, wherein the load flank has an angle of 18°.

6. A drill pipe connector as defined in claim 1, wherein the internal thread section in the sleeve element has a steeper taper inclination than the external thread section in the journal element.

7. A drill pipe connector as defined in claim 6, wherein the difference in taper inclination is 0.03 to 0.3 mm/inch.

8. A drill pipe connector as defined in claim 1, wherein the sleeve has an outer surface equipped with an internal turning from the face to about over a third thread.

* * * * *